(12) United States Patent
Hurley, Sr.

(10) Patent No.: US 11,117,508 B2
(45) Date of Patent: Sep. 14, 2021

(54) ANCHOR SPADE ATTACHMENT

(71) Applicant: Jed Murph Hurley, Sr., Cambridge, MD (US)

(72) Inventor: Jed Murph Hurley, Sr., Cambridge, MD (US)

(*) Notice: Subject to any disclaimer, the term of this patent is extended or adjusted under 35 U.S.C. 154(b) by 0 days.

(21) Appl. No.: 17/099,640

(22) Filed: Nov. 16, 2020

(65) Prior Publication Data

US 2021/0213865 A1    Jul. 15, 2021

Related U.S. Application Data

(63) Continuation-in-part of application No. 29/741,782, filed on Jul. 15, 2020, and a continuation-in-part of application No. 16/778,990, filed on Jan. 31, 2020, now Pat. No. 10,864,840, which is a continuation-in-part of application No. 29/720,754, filed on Jan. 15, 2020, now Pat. No. Des. 891,352.

(51) Int. Cl.
*A01D 7/04* (2006.01)
*B60P 3/12* (2006.01)

(52) U.S. Cl.
CPC .................................... *B60P 3/12* (2013.01)

(58) Field of Classification Search
CPC .... A01D 7/04; A01D 7/06; A01D 7/08; B60T 1/14; B60T 3/00; B60P 3/06; B60P 3/077
USPC ............... 56/400.04, 400.11, 400.17, 400.2; 188/4 R, 5–7, 30–32; 414/563; 280/763.1
See application file for complete search history.

(56) References Cited

U.S. PATENT DOCUMENTS

| | | | | |
|---|---|---|---|---|
| 1,469,957 A | * | 10/1923 | Rich | A01B 1/225 172/372 |
| 1,515,927 A | * | 11/1924 | Claire | A01D 7/04 56/400.2 |
| 1,607,037 A | * | 11/1926 | Barnes | A01D 7/04 56/400.04 |
| 2,036,910 A | | 4/1936 | Balensiefer | |

(Continued)

FOREIGN PATENT DOCUMENTS

JP    2018505083 A    2/2018

OTHER PUBLICATIONS

"Claw Anchors—Stainless Steel", https://www.lewmar.com/node/11597.

(Continued)

*Primary Examiner* — Christopher P Schwartz

(57) ABSTRACT

An anchor spade attachment is disclosed and includes a ground engaging component comprising a platform, a first plurality of teeth and a second plurality of teeth. A first body is longitudinally affixed to the ground engaging component. A second body is longitudinally affixed to the first body. A reinforcing plate is affixed to the platform, the first body, and the second body. The reinforcing plate is positioned orthogonal to the platform. The first plurality of teeth is positioned orthogonal and adjacent to the platform. The second plurality of teeth is positioned orthogonal and adjacent to the platform. The first body and the second body are each positioned orthogonal to the ground engaging component. The first body is centrally positioned on the platform. The platform longitudinally traverses the first body. The second body longitudinally traverses the first body. The second body extends beyond the first body.

5 Claims, 4 Drawing Sheets

(56) References Cited

U.S. PATENT DOCUMENTS

| | | | | |
|---|---|---|---|---|
| 2,066,036 A | * | 12/1936 | Greenwood | A01D 7/08 |
| | | | | 56/400.17 |
| 3,613,802 A | * | 10/1971 | Carlson | A01D 76/00 |
| | | | | 172/457 |
| 4,150,528 A | * | 4/1979 | Rendin | A01D 7/00 |
| | | | | 56/400.16 |
| 5,099,638 A | * | 3/1992 | Bass | A01D 7/06 |
| | | | | 56/400.16 |
| D891,352 S | | 7/2020 | Hurley | |
| 10,864,840 B1 | * | 12/2020 | Hurley, Sr. | B60P 3/06 |

OTHER PUBLICATIONS

"AW Direct Ice Claw for 3.5" Crossbar", https://zips.com/parts-detail/aw-direct-ice-claw-for-3-5-crossbar-sricl2.

"New Falkorn carrier/wrecker in the UK", https://www.tapatalk.com/groups/tow411/new-falkom-carrier-wrecker-in-the-uk-t125227.html.

"EZUNSTUCK Car Tire Anti-Skid Tool", https://www.amazon.com/EZUNSTUCK-Car-Tire-Anti-Skid-Tool/dp/B07L7KZL5R.

* cited by examiner

ANCHOR SPADE ATTACHMENT

CROSS-REFERENCE TO RELATED APPLICATIONS

This application is a continuation-in-part of U.S. patent application Ser. No. 16/778,990 filed Jan. 31, 2020. This application is hereby incorporated herein by reference.

FIELD OF THE INVENTION

The present disclosure relates generally to light duty tow truck and light duty rollback crossbars. More specifically, the present disclosure describes anchor spade attachments for light duty tow trucks and or light duty rollback crossbars.

BACKGROUND OF THE INVENTION

A light duty tow truck or light duty rollback is a truck that is used to move disabled, improperly parked, impounded, or otherwise indisposed motor vehicles. This may involve recovering a vehicle damaged in an accident, returning one to a drivable surface in a mishap or recovery due to inclement weather or towing or transporting one via rollback to a repair shop or other location. Some light duty tow trucks and or rollbacks may include a wheel-lift, which is a device utilized for towing vehicles by lifting one end of the towed vehicle by the wheels. Wheel-lifts, which are hydraulically powered, typically include a boom and a crossbar centrally and rotatably coupled thereto. A boom is a structural member, extending from a mast, that supports the load and is used to hold, extend or lift a load free of the ground and clear of the tow truck body. Crossbars can typically receive attachments on its ends that facilitate vehicle attachment.

BRIEF DESCRIPTION OF THE DRAWINGS

Some of the embodiments will be described in detail, with reference to the following figures, wherein like designations denote like members, wherein.

Figure 1:
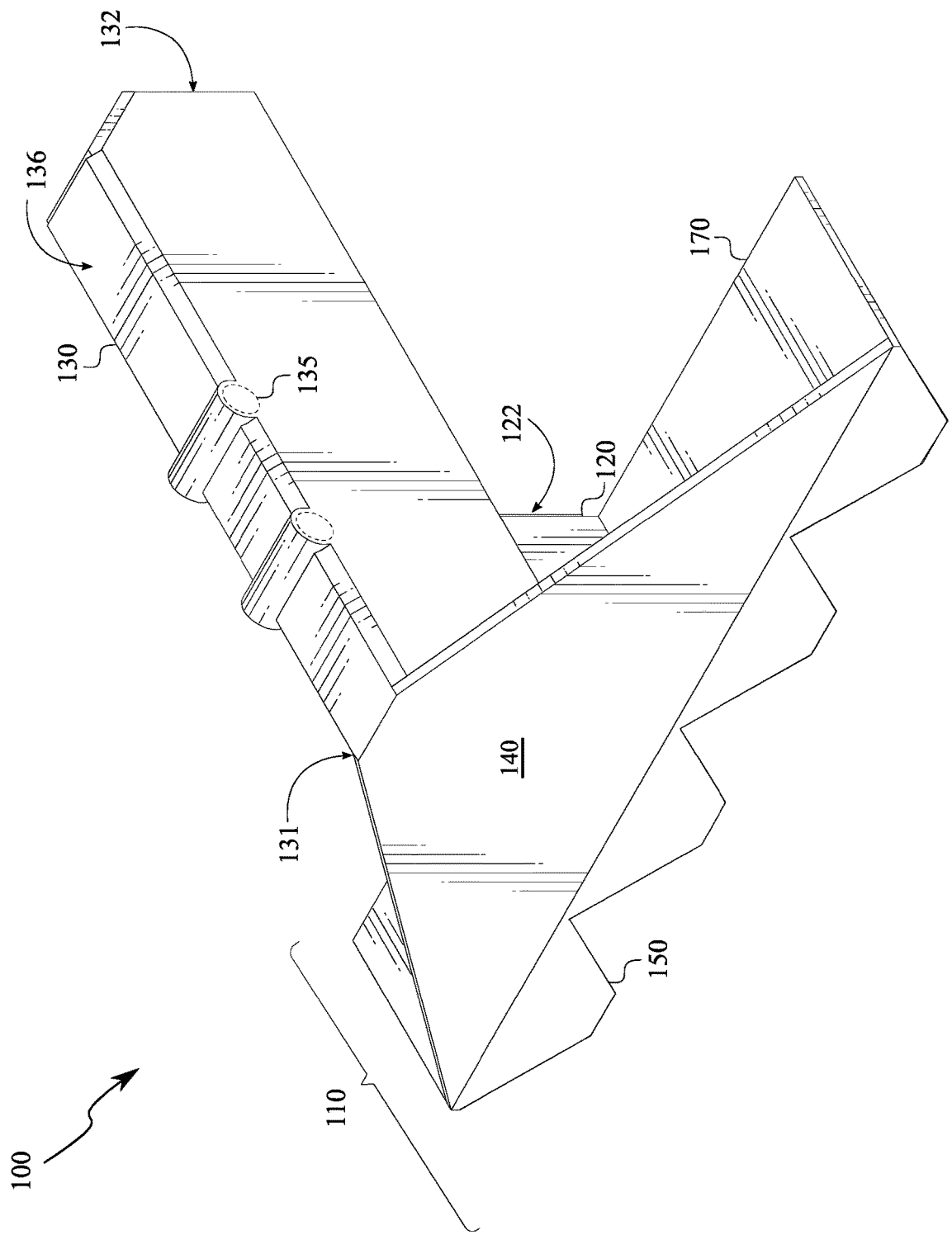
FIG. 1 illustrates a front top perspective view of an anchor spade attachment according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of detection of presence of one or more intruder devices, embodiments of the present disclosure are not limited to use only in this context.

A light duty tow truck or light duty rollback is a truck that is used to move disabled, improperly parked, impounded, or otherwise indisposed motor vehicles. This may involve recovering a vehicle damaged in an accident, returning one to a drivable surface in a mishap or inclement weather, or towing or transporting one via rollback to a repair shop or other location. Some light duty tow trucks and or light duty rollbacks may include a wheel-lift, which is a device utilized for towing vehicles by lifting one end of the towed vehicle by the wheels. Wheel-lifts, which are hydraulically powered, typically include a boom and a crossbar centrally and rotatably coupled thereto. A boom is a structural member, extending from a mast, that supports the load and is used to hold, extend or lift a load free of the ground and clear of the tow truck body. Crossbars can typically receive attachments on its ends that facilitate vehicle attachment.

Figure 2:
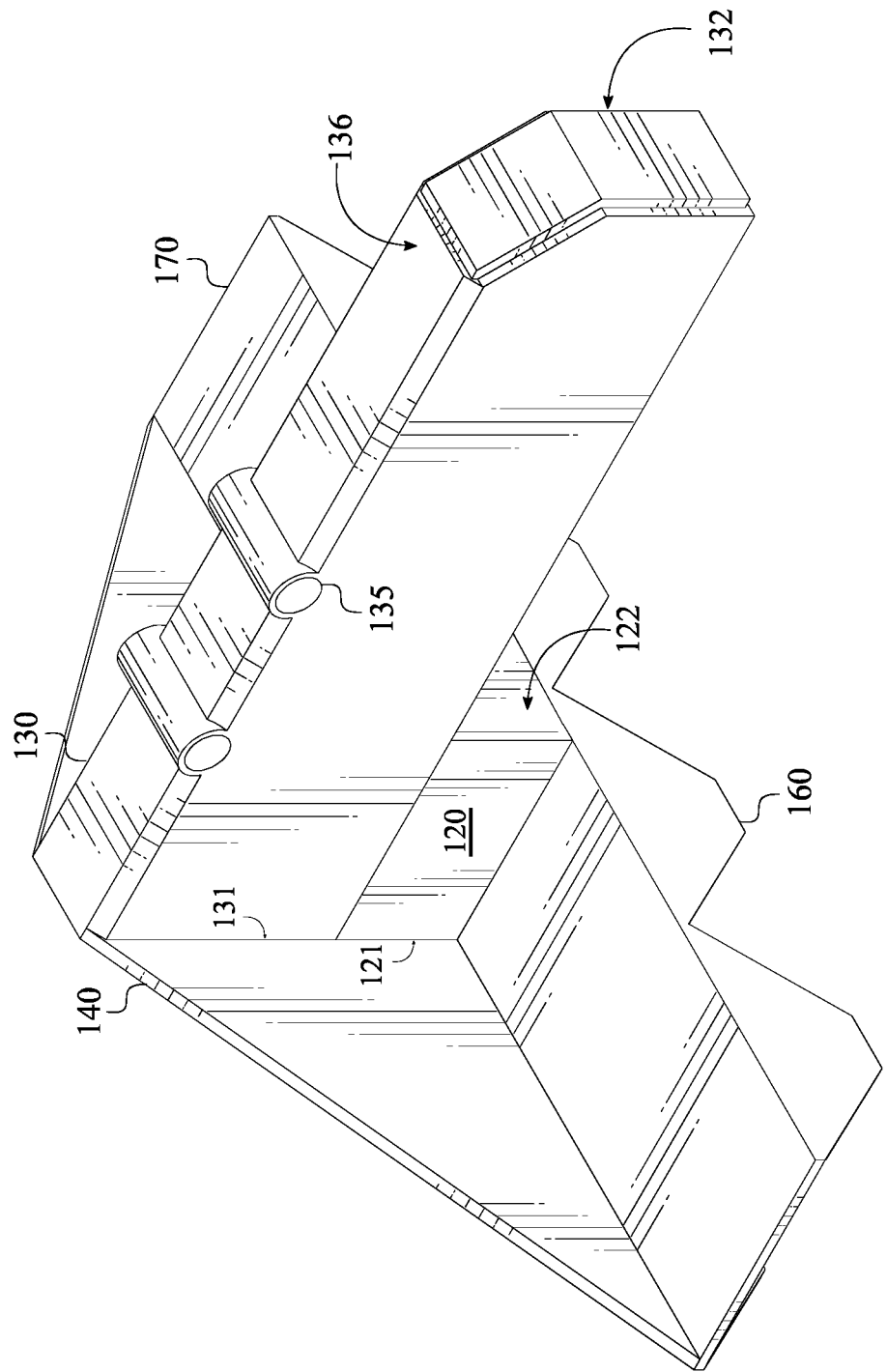
FIG. 2 illustrates a rear top perspective view of the anchor spade attachment according to certain embodiments.
Figure 3:
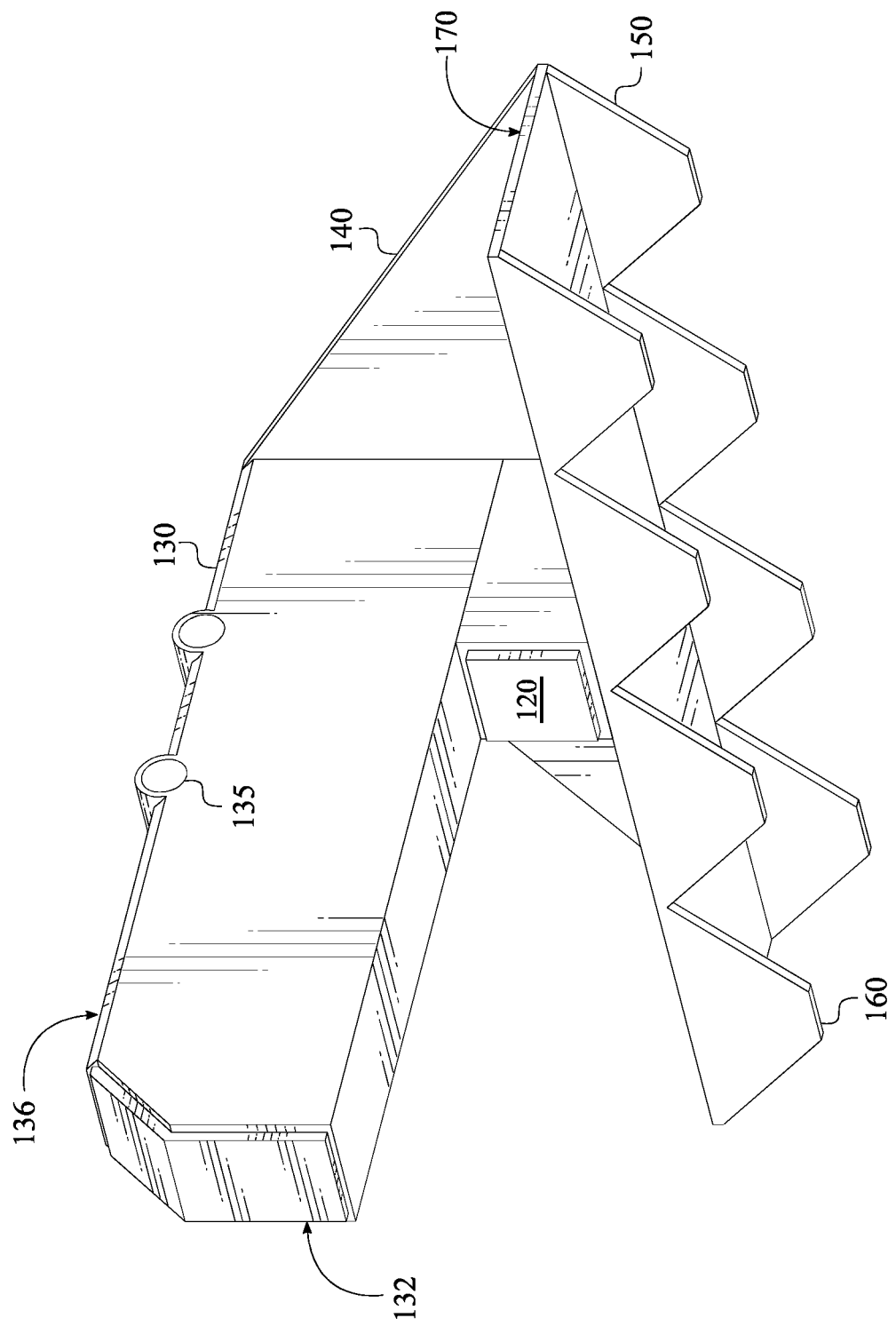
FIG. 3 illustrates a bottom perspective view of the anchor spade attachment according to some embodiments.
Figure 4:
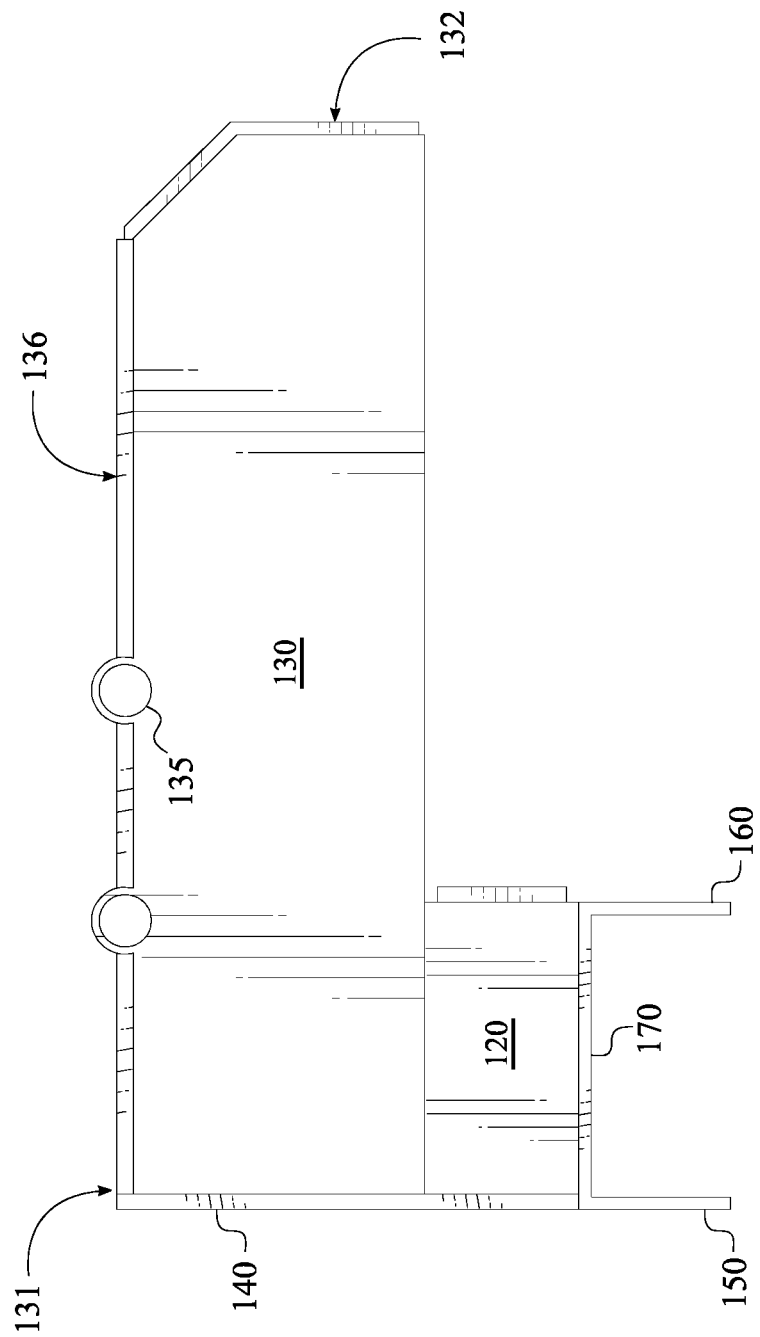
FIG. 4 illustrates a right-side view of the anchor spade attachment according to other embodiments.

The instant application seeks to provide an anchor spade attachment, generally 100, that allows tow truck crossbars to engage ground surfaces with reduced movement thereon according to certain embodiments. Referring now to FIGS. 1-4. In general, components of the anchor spade attachment 100 (discussed further below) can be of and/or include therein any shape, size, material, features, type or kind, orientation, location, quantity, components, and arrangement of components that would fulfill the objectives and intents of the instant disclosure. Components of the anchor spade attachment 100 are preferably made of steel, which provide corrosion resistance, hardness, yield strength, and tensile strength. Here, steel is the preferred building material, due to its relatively low cost, high strength-to-weight ratio and speed of construction. In preferred embodiments, the anchor spade attachment 100 is assembled by welding together to components disclosed below. Although other metals are available, such materials lack the superior physical characteristics of steel and should be avoided.

In preferred embodiments, the anchor spade attachment 100 includes a ground engaging component 110, which is configured to engage ground surfaces. The ground engaging component 110 includes a platform 170, a first plurality of teeth 150, and a second plurality of teeth 160. The platform 170 preferably has a planar and rectangular shape. For example, the platform 170 is an oblong equiangular structure. The first plurality of teeth 150 and the second plurality of teeth 160 are each preferably positioned orthogonal and adjacent to the platform 170. The first plurality of teeth 150 and the second plurality of teeth 160 are each laterally positioned on the platform 170 opposite each other. In other words, the first plurality of teeth 150 are longitudinally positioned on a first side of the platform 170 and the second plurality of teeth 160 are longitudinally positioned on a second side of the platform 170 opposite the first side.

As used herein, the term "teeth" refer to protrusions configured to engage ground surfaces. In preferred embodiments, each of the first plurality of teeth 150 and the second plurality of teeth 160 are planar and substantially quadrilaterally shaped. For example, an edge of each of the aforementioned pluralities of teeth are positioned adjacent to the platform 170. A first body 120 is preferably longitudinally affixed to the ground engaging component 110. In the same vein, a second body 130 is preferably longitudinally affixed to the first body 120. The first body 120 is centrally positioned on the platform 170, in accordance with preferred embodiments. The platform 170 longitudinally traverses the first body 120. To orient the panel 170 parallel with tow truck crossbars (e.g., tow truck crossbar 820), the first body 120 and the second body 130 are each positioned orthogonal to the ground engaging component 110.

To resist torsional forces, for example, the first body 120 and the second body 130 each preferably have an overall rectangular shape and a square cross section. In preferred embodiments, the second body 130 longitudinally traverses the first body 120. For example, the second body 130 extends beyond the first body 120. The second body 130 preferably longitudinally extends beyond the first body 120. In this manner, for example, the second body 130 is configured to be inserted into a tow truck crossbar receiver. The second body includes a top surface 136. To assist in the aforementioned insertion, the second body 130 includes at least two laterally positioned orifices 135 that are positioned adjacent to the top surface 136. In preferred embodiments, the orifices 135 traverse the top surface 136.

Light duty tow trucks and or light duty rollbacks can typically lift and/or transport vehicles/loads that are as much as 3,500 pounds, which can put tow trucks or rollbacks under tremendous strain. To assist the platform 170 to resist torsional forces, a reinforcing plate 140 is orthogonally affixed to the platform 170, the first body 120, and the second body 130. The reinforcing plate 140 is substantially planar and triangular in shape.

The first body 120 includes a first proximal end 121 and a first distal end 122 positioned opposite the first proximal end 121. The second body 130 includes a second proximal end 131 and a second distal end 132 positioned opposite the second proximal end 131. The first proximal end 121 is positioned adjacent to the second proximal end 131. The reinforcing plate 140 is affixed to the first proximal end 121 and the second proximal end 131, which assists the platform 170 to resist torsional forces.

Although the disclosure has been explained in relation to its preferred embodiment, it is to be understood that many other possible modifications and variations can be made without departing from the spirit and scope of the disclosure.

What is claimed is:

1. An anchor spade attachment, comprising:
a ground engaging component comprising a platform, a first plurality of teeth and a second plurality of teeth;
a first body longitudinally affixed to the ground engaging component;
a second body longitudinally affixed to the first body;
a reinforcing plate affixed to the platform, the first body, and the second body;
wherein
the reinforcing plate is positioned orthogonal to the platform;
the first plurality of teeth is positioned orthogonal and adjacent to the platform;
the second plurality of teeth is positioned orthogonal and adjacent to the platform;
the first body and the second body are each positioned orthogonal to the ground engaging component;
the first body is centrally positioned on the platform;

wherein the platform longitudinally traverses the first body;
wherein
the second body longitudinally traverses the first body;
the second body extends beyond the first body;
wherein the second body is configured to be inserted into a light duty tow truck and or light duty rollback crossbar receiver;
wherein
the first body comprises a first proximal end and a first distal end positioned opposite the first proximal end;
the second body comprises a second proximal end and a second distal end positioned opposite the second proximal end;
the first proximal end is positioned adjacent to the second proximal end;
the reinforcing plate is affixed to the first proximal end and the second proximal end;
wherein
the second body comprise a top surface;
the second body comprises at least two laterally positioned orifices;
the laterally positioned orifices are positioned adjacent to the top surface;
wherein the first body is a hollow structure that comprises:
an overall rectangular shape;
a square cross section;
wherein the second body is a hollow structure that comprises:
an overall rectangular shape;
a square cross section;
wherein the reinforcing plate is substantially planar and triangular in shape.

2. The anchor spade attachment of claim 1, wherein each of the first plurality of teeth are planar and substantially quadrilaterally shaped.

3. The anchor spade attachment of claim 2, wherein each of the second plurality of teeth are planar and substantially quadrilaterally shaped.

4. An anchor spade attachment, comprising:
a ground engaging component comprising a platform, a first plurality of teeth and a second plurality of teeth;
a first body longitudinally affixed to the ground engaging component;
a second body longitudinally affixed to the first body;
a reinforcing plate affixed to the platform, the first body, and the second body;
wherein
the reinforcing plate is positioned orthogonal to the platform;
the first plurality of teeth is positioned orthogonal and adjacent to the platform;
the second plurality of teeth is positioned orthogonal and adjacent to the platform;
the first body and the second body are each positioned orthogonal to the ground engaging component;
the first body is centrally positioned on the platform;
the platform longitudinally traverses the first body;
wherein
the second body longitudinally traverses the first body;
the second body extends beyond the first body;
wherein the second body is configured to be inserted into a light duty tow truck and or light duty rollback crossbar receiver;
wherein
the first body comprises a first proximal end and a first distal end positioned opposite the first proximal end;
the second body comprises a second proximal end and a second distal end positioned opposite the second proximal end;
the first proximal end is positioned adjacent to the second proximal end;
the reinforcing plate is affixed to the first proximal end and the second proximal end;
wherein
the second body comprise a top surface;
the second body comprises at least two laterally positioned orifices;
the laterally positioned orifices are positioned adjacent to the top surface;
wherein the first body is a hollow structure that comprises:
an overall rectangular shape;
a square cross section;
wherein the second body is a hollow structure that comprises:
an overall rectangular shape;
a square cross section;
wherein the reinforcing plate is substantially planar and triangular in shape.

5. The anchor spade attachment of claim 4, wherein
each of the first plurality of teeth are planar and substantially quadrilaterally shaped; and
each of the second plurality of teeth are planar and substantially quadrilaterally shaped.

* * * * *